United States Patent [19]

Miller

[11] 4,312,480
[45] Jan. 26, 1982

[54] RADIATION SHIELDING AND GAS DIFFUSION APPARATUS

[75] Inventor: Robert C. Miller, Encino, Calif.

[73] Assignee: Hughes Helicopters, Inc., Culver City, Calif.

[21] Appl. No.: 97,130

[22] Filed: Nov. 26, 1979

[51] Int. Cl.³ .............................................. F02K 1/00
[52] U.S. Cl. .................................. 239/127.3; 60/39.5; 60/264; 60/266; 239/265.17
[58] Field of Search ................. 60/39.5, 204, 264–266, 60/271, 751, 755–760; 239/127.3, 132.5, 265.4, 265.17, 265.19

[56] References Cited

U.S. PATENT DOCUMENTS

| | | | |
|---|---|---|---|
| 3,210,934 | 10/1965 | Smale | 60/265 |
| 4,007,587 | 2/1977 | Banthin et al. | 60/39.5 X |
| 4,136,518 | 1/1979 | Hurley et al. | 60/264 |
| 4,215,537 | 8/1980 | Hurley | 239/265.19 X |

*Primary Examiner*—Andres Kashnikow

*Attorney, Agent, or Firm*—Smyth, Pavitt, Siegemund & Martella

[57] ABSTRACT

A device for shielding a heated surface from infra-red detection through an opening adjacent to the heated surface. The device includes a gas-conducting member, which is adapted to receive heated gases, and has an exterior surface, an interior surface, an inlet for receipt of heated gases from the opening, and an outlet for the discharge of gases. The gas-conducting member has a configuration which blocks the inlet to the member from line-of-sight view through the outlet to the member. Additionally, the device draws cooling air over the exterior surface of the gas-conducting member. The cooling air may then be mixed with the heated gases within the gas conducting member. This provides cooling of the gas-conducting member to prevent the member from being visible to infra-red detection and may also provide cooling of the gases which are discharged from the outlet of the gas-conducting member by mixing of the heated gases with the cooling air.

21 Claims, 14 Drawing Figures

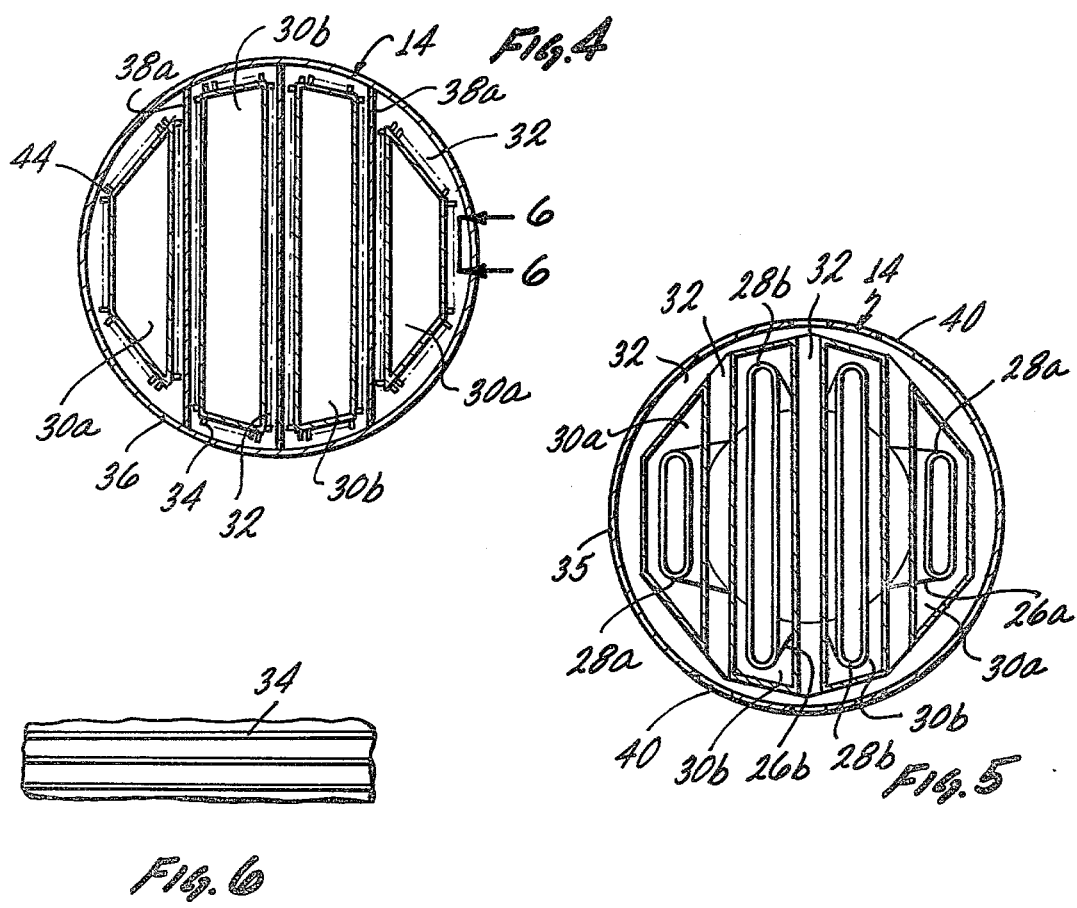
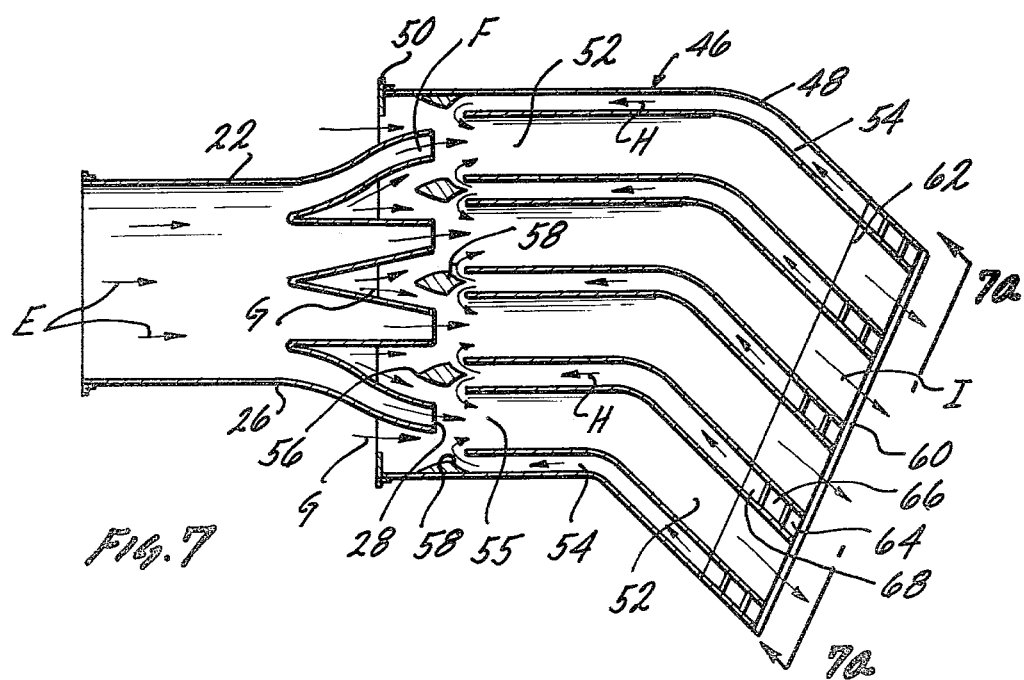

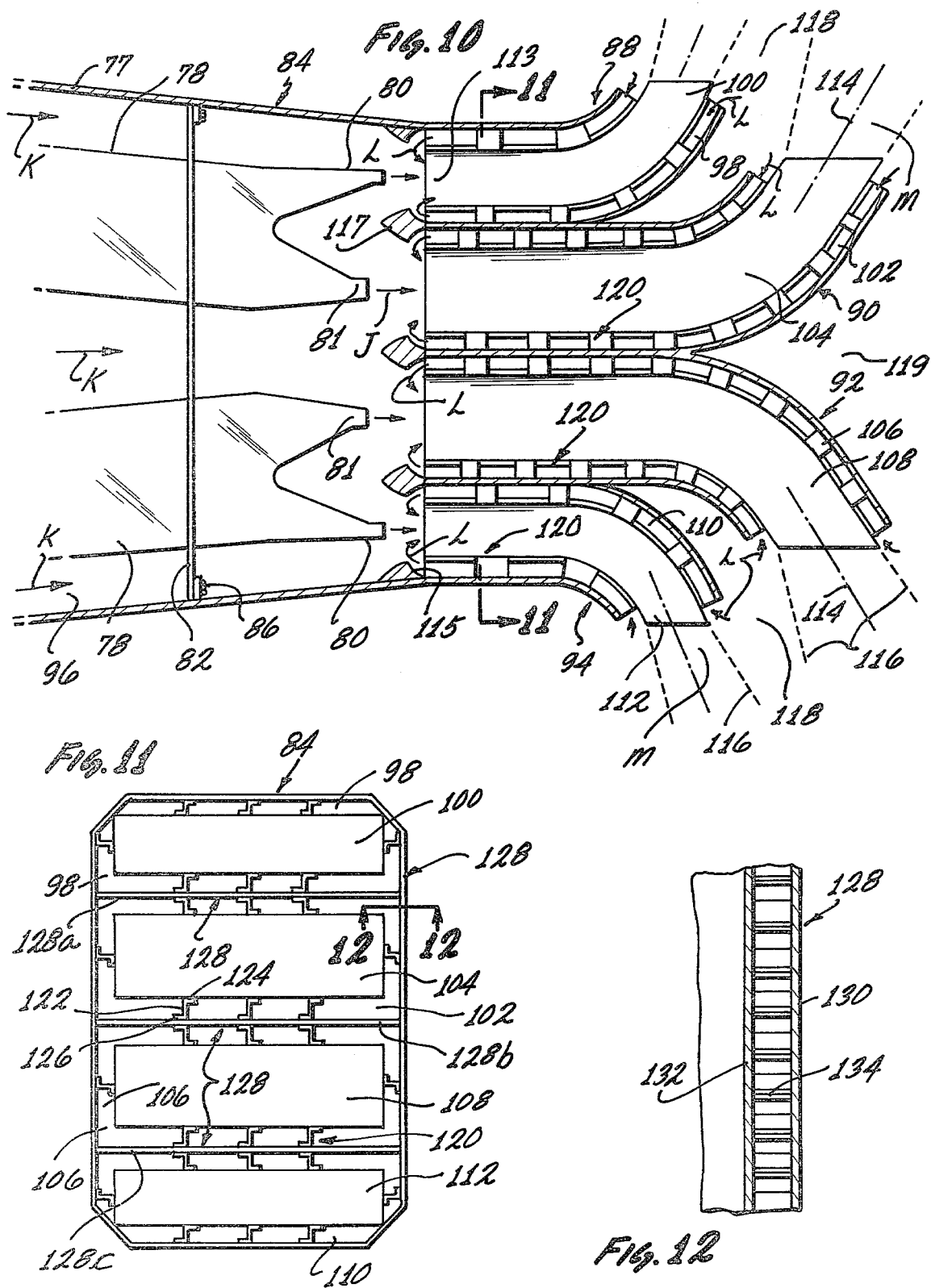

RADIATION SHIELDING AND GAS DIFFUSION APPARATUS

BACKGROUND OF THE INVENTION

Military aircraft are powered by engines which generate heat that produces hot metal surfaces within the engine as well as a stream of heated exhaust gases. These sources of infra-red radiation, i.e., the hot metal engine surfaces and the stream of heated exhaust gas, provide a target source for heat-seeking missiles which can lock on the target source and be led to the aircraft.

To provide a military aircraft with a power source which is not easily discernible by a heat-seeking missile, a first step would be to insulate the surfaces of the aircraft engine. An insulation material which is well suited for this purpose is disclosed in U.S. Pat. Nos. 4,037,751 and 3,948,295.

The insulation of the aircraft engine surfaces does not, however, prevent viewing of the engine by a heat-seeking missile. Even when the aircraft engine is well insulated, hot metal surfaces within the engine interior may still be viewed by a heat-seeking missile through an opening for exhaust gases positioned adjacent to the hot interior surfaces. In addition to insulating the exterior surface of the engine, it is, therefore, also necessary to block the hot surfaces within the engine interior from being viewed through the exhaust gas opening. Additionally, it is necessary to reduce infra-red radiation from the hot plume of exhaust gases that is emitted by the aircraft engine such that the exhaust gases cannot be readily detected by a heat-seeking missile.

The device disclosed in my prior U.S. Pat. No. 3,930,627 serves to prevent the detection of an aircraft by a heat-seeking missile by providing an exhaust gas-conducting member that is adapted to receive heated exhaust gases from an exhaust opening of an aircraft engine. The device of my prior patent provides a configuration which blocks the exhaust opening of the engine from line-of-sight view through the outlet of the exhaust gas-conducting member. Additionally, the device of my prior patent functions to reduce infra-red radiation from exhaust gases emitted by the aircraft engine by breaking up the stream of exhaust gas into a plurality of smaller streams and mixing cooling air with the heated exhaust gases.

In accomplishing these beneficial results, the device of my prior U.S. Pat. No. 3,930,627 employs cooling air which is received by an air intake which leads to the interior of the gas conducting member. The cooling air is received by the device of my prior patent as the aircraft moves the device through the air. Additionally, airflow may be generated by the propeller or rotor that is driven by the aircraft engine, with the airflow being received by the air intake and conveyed to the interior of the gas-conducting member. The airspeed of a military aircraft, particularly a helicopter, will not be constant. As a result, the quantity of cooling air received by the gas-conducting member in the device of my prior patent will vary during the operation of the aircraft. This variation in the quantity of cooling air may produce variations in the heat content of the exhaust gases from the exhaust gas member. Also, there may be some degree of fluctuation in the temperature of the exhaust gas member in my prior device. In a hovering helicopter having an airspeed of zero, the exhaust gases discharged from the gas-conducting member in my prior device may experience a rapid temperature increase such that the gases become visible to infra-red detection. This could be disastrous and result in the loss of the aircraft to a heat-seeking missile.

In view of the possible fluctuations in the operation of the device of my prior patent, U.S. Pat. No. 3,930,627, in response to changes in the airspeed of the host aircraft, a radiation shielding device would be desirable whose operation would be less dependent upon the airspeed of the host vehicle. This would permit the radiation shielding device to operate efficiently even when the vehicle had an airspeed of zero, as in the case of a hovering helicopter. Also, this would permit the use of the radiation shielding device on a stationary power source in shielding the power source from detection by a heat-seeking missile.

SUMMARY OF THE INVENTION

The present invention pertains to an improvement in a radiation shielding and gas diffusion apparatus, as disclosed in my prior U.S. Pat. No. 3,930,627. In the apparatus of the present invention, energy derived from the heated exhaust gases is used to provide a relatively constant flow of cooling air to cool the radiation shielding device and to cool the heated exhaust gases. The device of the invention functions to shield a heated surface from infra-red detection through an opening adjacent to the heated surface and employs a gas-conducting member which is adapted to receive heated gases from the said opening. The gas-conducting member includes an exterior surface, an interior surface, an inlet for the receipt of gases from the opening, and an outlet for the discharge of gases. The member has a configuration which blocks the inlet to the gas-conducting member from line-of-sight view through the outlet of the member. Heated engine surfaces, therefore, are not visible to line-of-sight view by a heat-seeking missile through the outlet of the gas-conducting member.

Additionally, the present device includes means to draw cooling air over the exterior surface of the gas-conducting member with the cooling air then being mixed with the heated gases in a mixing region within the gas-conducting member. The means to draw cooling air does not depend upon an airflow generated by movement of the gas-conducting member through the air or upon the movement of an aircraft propeller or rotor. Thus, the device of the invention functions when the device is at rest to cool the surfaces of the gas-conducting member such that the member is not visible to infra-red detection. Also, the device of the invention functions to cool the heated exhaust gases through mixing of the heated gases with cooling air within the gas-conducting member.

In drawing cooling air over the exterior surface of the gas-conducting member, the cooling air may be drawn to a mixing region where the cooling air is mixed with the heated gases, which is positioned adjacent to the outlet from the gas-conducting member. Also, the present device may function to draw cooling air over the exterior surface of the gas-conducting member to a mixing region that is positioned adjacent to the inlet to the gas-conducting member.

The device of the invention preferably includes flow passages formed on the exterior surface of the gas-conducting member with the flow passages serving to convey cooling air over the exterior surface of the gas-conducting member. When cooling air is drawn into a mixing region which is adjacent to the outlet from the gas-conducting member, the flow of cooling air over the exterior surface is in the same general direction as the flow of heated gases within the gas-conducting member, i.e., flow of heated gases and the flow of cooling air being cocurrent. However, when cooling air is drawn into a mixing region which is positioned adjacent to the inlet to the gas-conducting member, the cooling air drawn over the exterior surface of the gas-conducting member flows in a direction which is counter to the flow of heated gases within the gas-conducting member. In this embodiment, the flow of cooling air is countercurrent to the flow of heated gases within the gas-conducting member.

In using the energy of the heated exhaust gases to draw cooling air over the exterior surface of the gas-conducting member, an expansion region may be provided within the gas-conducting member. The expansion region permits the expansion of heated gases which are received through the inlet to the gas-conducting member. On expansion of the heated gases, the pressure is reduced to generate a partial vacuum which may serve as the driving force to draw cooling air over the surface of the gas-conducting member to a mixing region within the gas-conducting member where the cooling air is mixed with the heated exhaust gases. To provide more efficient cooling of the gas-conducting member by the cooling air, means may be employed to increase the heat transfer between the cooling air and the gas-conducting member. In this manner, the heat transfer through the gas-conducting member may be maximized with heat being removed from heated gases within the member, and the heat being transferred through the gas-conducting member to the cooling air in contact with the member.

The gas-conducting member may include a plurality of passages therein for the receipt of heated exhaust gases and for the discharge of gases. Each of the passages may have an exterior surface with the passages being separated from each other and with the spaces between the passages forming cooling air passages. In this manner, cooling air may be drawn over the exterior surface of each of the exhaust gas passages to provide cooling of the individual exhaust gas passages within the gas-conducting member.

In providing a configuration which prevents line-of-sight viewing of the inlet to the gas-conducting member through its outlet, the member may have a cross-sectional configuration which is elongated and generally rectangular or elliptical. The gas-conducting member may then be curved such that exhaust gas entering the inlet passes along a curved path before being discharged from the outlet. In passing along the curved path, the radial dimension across the gas-conducting member may be relatively small. This permits making the gas-conducting member more compact than would be the case if the gas-conducting member had a circular cross-sectional configuration. With a circular cross-sectional configuration, the gas-conducting member requires a relatively large curvature to block the inlet to the member from line-of-sight viewing through the outlet from the member. However, when the gas-conducting member is provided with an elongated cross-sectional configuration, the radius of curvature of the gas-conducting member may be greatly reduced while preventing line-of-sight viewing of the inlet to the member through the outlet from the member.

The shape of the gas-conducting member or the shape of a plurality of exhaust gas flow passages within the member in the present device changes the shape of the exhaust gas stream discharged from the outlet of the gas-conducting member to a shape having a lower emissivity such that heat and energy are more readily dissipated from the stream. By providing the gas-conducting member with an elongated configuration, such as a generally rectangular or elliptical cross-sectional configuration, the exhaust gases are more difficult to detect through infra-red radiation than an equivalent exhaust gas stream having a circular configuration.

THE DRAWINGS

To more fully describe the invention with respect to preferred embodiments thereof, reference is made to the accompanying drawings, in which:

FIG. 4 is a sectional view taken along the line 4—4 of FIG. 3, illustrating the cross-sectional configuration of the gas ducts and the cooling air passages which contact the exterior surfaces of the exhaust ducts;

FIG. 5 is a sectional view taken along the line 5—5 of FIG. 3, illustrating the configuration of the exhaust nozzles through which exhaust gases are discharged into the exhaust ducts of the radiation shielding and gas diffusion apparatus;

FIG. 6 is a detail view taken along the line 6—6 of FIG. 4 to illustrate the configuration of cooling fins positioned within the cooling air passages to promote heat transfer from the exhaust ducts to cooling air within the cooling air passages;

Figure 3:
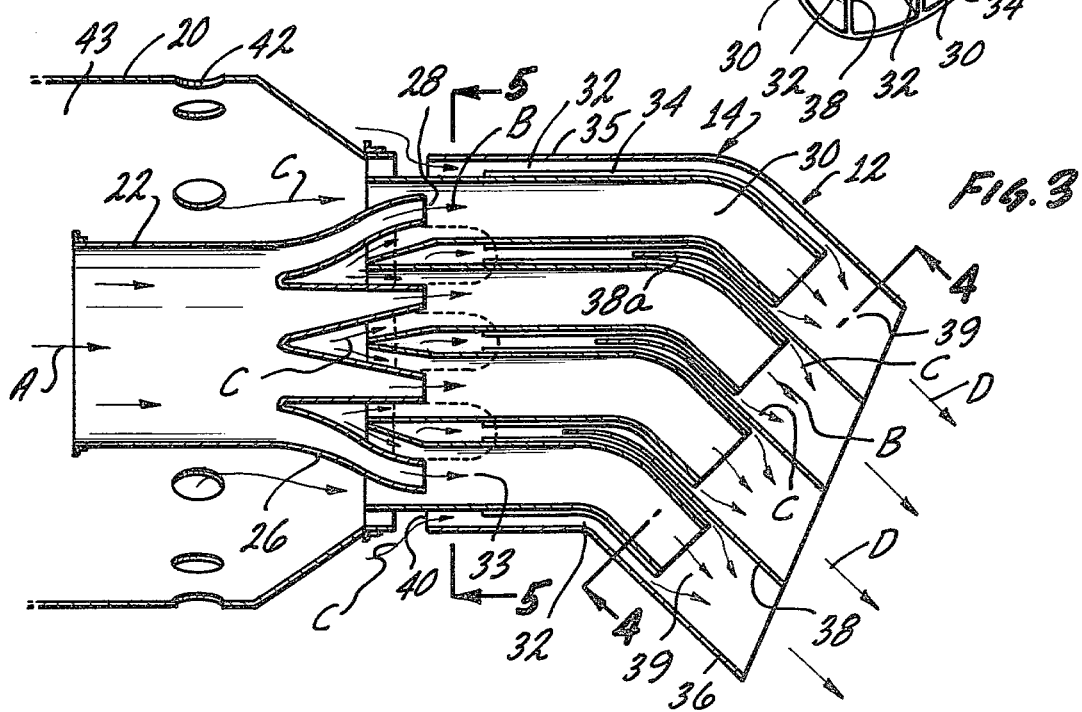
FIG. 3 is a top sectional view of the device of FIG. 2 illustrating the flow of cooling air over the exterior surfaces of exhaust ducts to a mixing region which is positioned adjacent to the outlet for the radiation shielding and gas diffusion apparatus where the cooling air is admixed with heated exhaust gases.
Figure 8:
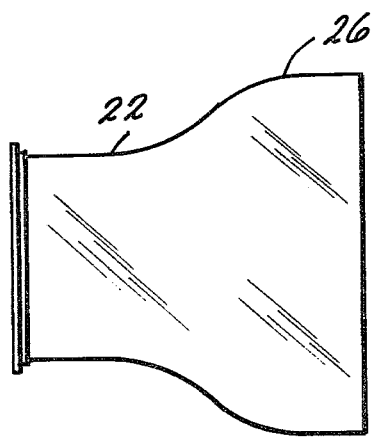
Figure 9:
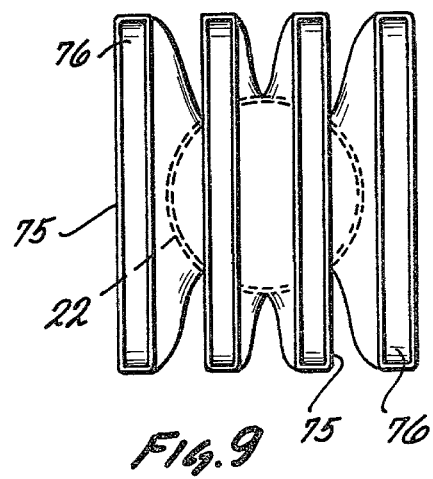
Figure 7A:
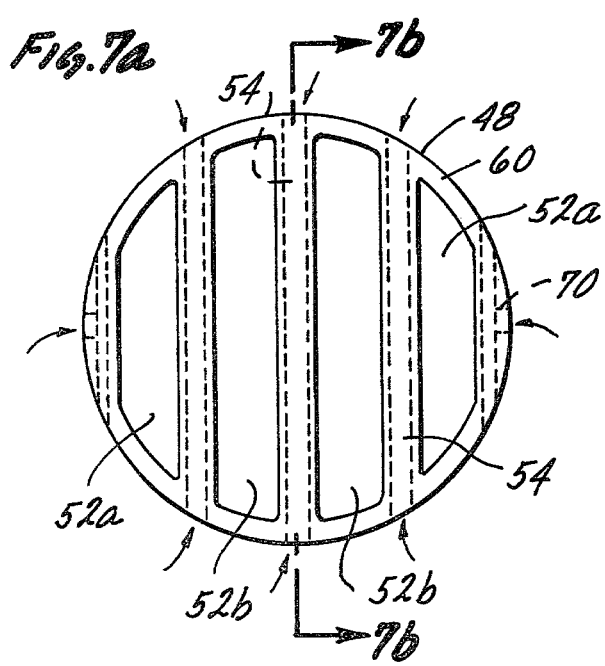
Figure 7B:
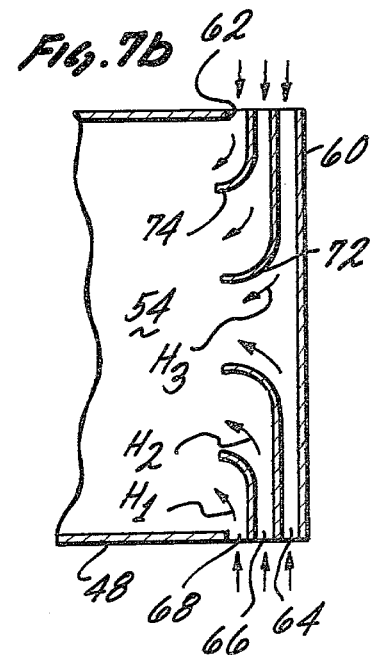

FIG. 7 is a sectional view, similar to FIG. 3, illustrating another embodiment of the invention in which cooling air is drawn over the exterior surface of the exhaust ducts in countercurrent flow to exhaust gases flowing within the exhaust ducts with the cooling air being drawn to a mixing region within the radiation shielding and gas diffusion apparatus which is adjacent to the inlets to the exhaust gas ducts;

FIG. 7a is a view taken along the line 7a—7a of FIG. 7 to illustrate the manner in which an end plate closes off the ends of the cooling air passages while permitting the discharge of exhaust gases through the ends of the exhaust ducts;

FIG. 7b is a sectional view taken along the line b—7b of FIG. 7a illustrating the position of diverter members within the cooling air passages such that the flow of cooling air is generally uniform within the air passages;

FIG. 8 is a side view of an engine exhaust conduit and one of the exhaust nozzles illustrating the manner in which the exhaust gases may be forced into an elongated flow configuration prior to discharge of the exhaust gases into a radiation shielding and gas diffusion apparatus of the invention;

FIG. 9 is an end view of an embodiment of an exhaust conduit and exhaust nozzles illustrating the way in which exhaust gas may be broken up into smaller exhaust gas streams, each of which is equal and has an elongated rectangular configuration;

FIG. 10 is a sectional view, similar to FIG. 7, which illustrates a further embodiment of my radiation shielding and gas diffusion apparatus in which cooling air is drawn through cooling air passages positioned on the exterior surfaces of exhaust gas ducts with the cooling air moving in countercurrent flow to the movement of exhaust gases within the gas ducts and with the cooling air being drawn to a mixing region within the apparatus which is adjacent to the inlets to the exhaust gas ducts;

FIG. 11 is a sectional view taken along the line 11—11 of FIG. 10 illustrating the manner in which the exhaust gas ducts are supported within a support shell through the use of Z-shaped supports; and, FIG. 12 is a detail view taken along line 12—12 of FIG. 11 to illustrate the support shell in which inner and outer sheets are held in spaced relation by a honeycomb separator.

DETAILED DESCRIPTION

Figure 1:
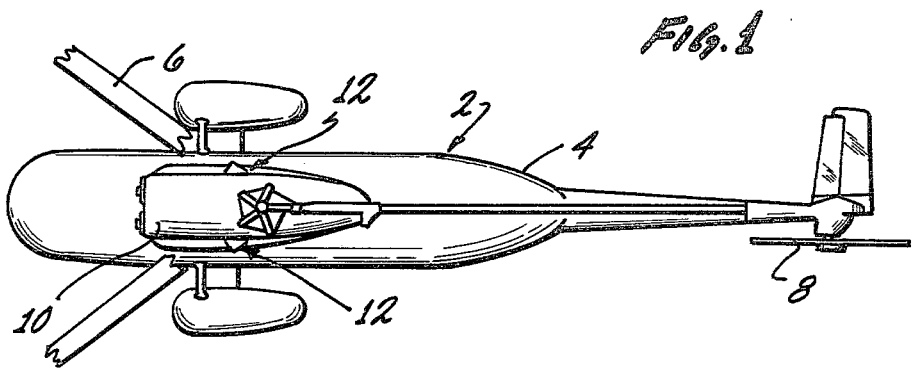
FIG. 1 is a plan view of a helicopter illustrating the placement on the helicopter of a radiation shielding and gas diffusion apparatus of the invention which receives heated exhaust gases from the helicopter engine.

Turning to FIG. 1, a helicopter, generally indicated as 2, includes a body 4, a main rotor 6, and a tail rotor 8. A power source for the helicopter 2 is enclosed within an engine compartment 10 with exhaust gases from the power source being discharged through infrared suppressors of the invention generally indicated as 12.

Figure 2:
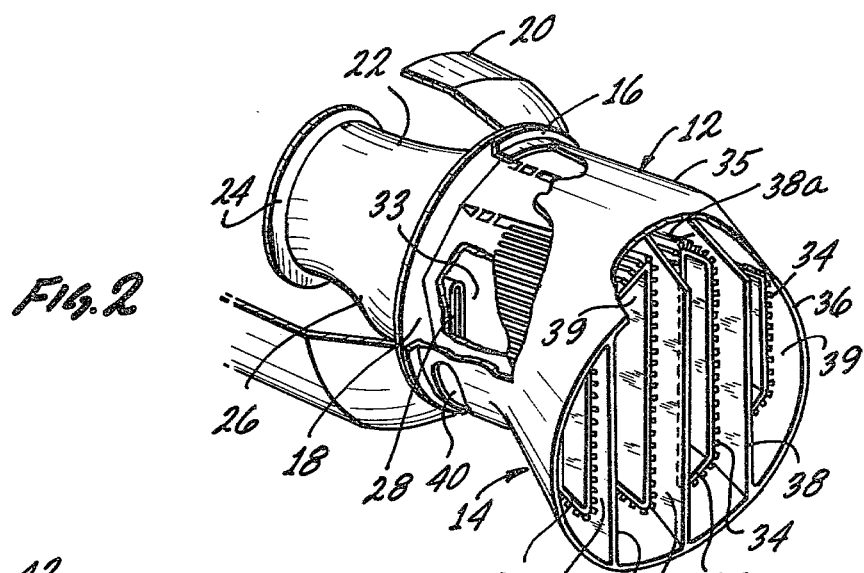
FIG. 2 is a perspective view of the radiation shielding and gas diffusion device of FIG. 1 with portions broken away for ease of description.

FIG. 2 is a perspective view of an infra-red suppressor 12 with portions broken away for ease of illustration. The infra-red suppressor 12 includes a cowl 14 having a flange 16 which may be secured to another connector flange 18 in any suitable manner in joining the infra-red suppressor to an ngine shroud 20. Exhaust conduit 22 having a front flange 24 for securing the exhaust conduit to the engine (not shown) is positioned within the engine shroud 20. The exhaust conduit 22 terminates in a plurality of exhaust nozzles 26 having exhaust openings 28. Exhaust gases are ejected through the exhaust openings 28 into exhaust ducts 30 with cooling air passages 32 surrounding the exhaust ducts to cool their exterior surfaces. The exhaust ducts 30 have a larger cross-sectional area than the openings 28 such that the discharge of exhaust gases from the openings into the ducts causes a reduction in pressure within the ducts to provide a first stage ejection region 33. Cooling fins 34 may be positioned within the passages 32 on the exterior surfaces of the exhaust ducts 30 to promote transfer of heat from the heated gases within the exhaust ducts to cooling air within the cooling air passages.

A main body portion 35 of the suppressor 12 forms the exterior wall of the suppressor with the main body portion merging rearwardly into a skirt portion 36. The exhaust ducts 30, cooling air passages 32, and cooling fins 34 are supported in spaced relation in any convenient manner relative to the body portion 35 while separators 38 positioned across the skirt portion 36 divide the skirt portion into a plurality of second stage ejection regions 39. The cross-sectional areas of the second stage ejection regions 39 are larger than the areas of the exhaust ducts 30 such that there is a reduction in pressure within the ejection regions as gases pass from the ducts into the ejection regions. Cooling air passing through cooling air passages 32 is mixed with exhaust gases passing through the exhaust ducts 30 within the second stage ejection regions 39. The energy of exhaust gases passing from the exhaust ducts 30 into the ejection regions 39 produces the reduction in pressure within the ejection regions which provides a driving force that draws cooling air through the cooling air passages 32 into the ejection regions. Separators 38 include inward extensions 38a that extend into air passages 32 such that cooling air flow within the cooling air passages is divided by the extensions with a portion of the air flow being directed to one ejection region 39 on one side of the extension while the remainder of the air flow is directed to the ejection region on the opposite side of the extension. A plurality of air intake openings 40 extend through the main body portion 35 to admit cooling air to the cooling air passages 32 which surround the exhaust gas ducts 30.

Turning to FIG. 3, which is a top sectional view through the suppressor 12 of FIG. 2, air intake openings 42 pass through the wall of the engine shroud 20 to the plenum 43 between the engine shroud and the exhaust conduit 22. The primary exhaust stream designated by the arrow A within the exhaust conduit 22 is broken up into a plurality of secondary exhaust streams B within the exhaust nozzles 26. Cooling air streams indicated by the arrows C are drawn through the air intake openings 40 and 42, as described, by the reduction in pressure within the first stage ejection regions 33 and the second stage ejection regions 39. The cooling air C introduced through intake openings 42 is admixed with the secondary exhaust streams B in the first stage ejection regions 33 while cooling air introduced through intake openints 40 passes through the cooling air passages 32 to the second stage ejection regions 39. Cooling air C may be drawn to ejection regions 33 from any opening into the plenum 43. Thus, for example, the upstream end of the plenum 43 may receive cooling air C from any location on the helicopter 2, such as the passenger compartment (not shown).

Within the ejection regions 33 and 39, the cooling air streams C mix with the gases received from the exhaust openings 28. This provides cooling of the exhaust gases to produce diluted exhaust streams indicated by the arrows D which are discharged from the infra-red suppressor 12. The diluted exhaust streams D are difficult to detect by an infra-red detector because the temperature of the streams D is reduced because of the mixing with the cooling air C. Additionally, the streams D may have an elongated, generally-rectangular configuration to reduce the emissivity of the streams as compared, for example, with streams having a circular configuration. The use of elongated, generally rectangular ducts 30 also assists in shielding the hot openings 28 from line-of-sight view through the downstream end of the infra-red suppressor 12, while permitting a reduction in the size and degree of curvature of the suppressor that is required for line-of-sight shielding. For example, if the suppressor 12, as viewed in FIG. 3, employed only a single duct to replace the ducts 30, the exhaust openings 28 would be readily visible to line-of-sight view through the downstream end of the infra-red suppressor 12. To shield the exhaust openings 38 from line-of-sight view from the downstream end of the suppressor 12 under these circumstances, it would then be necessary to make the suppressor much larger so as to give the suppressor a much greater curvature than in FIG. 3. This would make the suppressor heavier and would make it more difficult to incorporate into an airframe structure because of its increased size.

In sizing the component parts of a suppressor 12, as illustrated in FIG. 3, it is desirable to have an equal pressure reduction in each of the first stage ejection regions 33 and an equal pressure reduction in each of the second stage ejection regions 39. Thus, the area ratio of each nozzle opening 28 with respect to the specific duct 30 into which the opening exhausts gas stream B may be maintained relatively constant, i.e., if the particular nozzle opening is larger or smaller than another of the nozzle openings, the duct into which the nozzle exhausts is also proportionately larger or smaller to maintain the area ratio constant.

Similarly, the area ratio of each duct 30 with respect to the specific second stage ejection region 39 into which the particular duct discharges is preferably maintained relatively constant. By maintaining the pressure reduction in each of the first stage ejection regions 33 relatively constant, and the pressure reduction in each of the second stage ejection regions 39 relatively constant, the flow of the cooling air streams C is more uniform throughout the suppressor 12. This provides uniformity in the cooling of the exterior surfaces of the ducts 30 and uniformity in the mixing of the cooling air streams C with the exhaust gas streams B to provide discharge streams D having a uniform temperature.

FIG. 4 is a sectional view taken along line 4—4 of FIG. 3. As indicated, the separators 38 are joined to the skirt portion 36 with the inward separator extensions 38a extending between the exterior surfaces of adjacent exhaust ducts 30 to divide the cooling air passages 32 (see FIG. 3). The cooling fins 34, as illustrated, extend longitudinally along the outer surfaces of the exhaust ducts 30. Due to the generally cylindrical cross-sectional configuration of the main body portion 35 (see FIG. 3) the outer two exhaust ducts 30a are smaller and have a different configuration than the inner two exhaust ducts 30b. The outer ducts 30a have a generally trapezoidal cross-sectional configuration, while the inner ducts 30b have a generally rectangular configuration. As stated, the fins 34 extend along the outside surfaces of the exhaust ducts 30. However, there are lines of separation 44 between the fins 34 which extend along corners of the walls of ducts 30. The corners of the walls of ducts 30 along the lines of separation 44 may be thought of as lines having only length and no area—thereby not requiring cooling.

FIG. 5 is a sectional view taken along the line 5—5 of FIG. 3. As indicated, the difference in the size and configuration of outer exhaust ducts 30a as compared with the inner exhaust ducts 30b is matched by outer nozzles 26a which are smaller than inner nozzles 26b. The outer nozzles 26a terminate in exhaust openings 28a which are likewise smaller than the exhaust openings 28b which are formed at the ends of inner nozzles 26b.

FIG. 6 is a detail view looking inward at the outer surface of exhaust duct 30a along the line 6—6 as shown in FIG. 4. As shown in FIG. 6, the cooling fins 34 are preferably straight in their configuration and extend longitudinally along the surfaces of the exhaust ducts 30.

FIG. 7 is a top sectional view, similar to FIG. 3, of another embodiment of my invention. An infra-red suppressor 46 includes a cowl 48 having a flange 50 or similar connector through which the cowl may be secured to a structure such as an aircraft body. A plurality of exhaust gas ducts 52 may be formed within the suppressor 46 with the ducts each having an elongated configuration, as described with respect to the suppressor 12 of FIG. 3. Cooling air passages 54 surround the exhaust ducts 52 to cool the exterior surfaces of the ducts. A primary exhaust gas stream, indicated by the arrows E, may pass through the exhaust conduit 22 with the primary stream being broken up into a plurality of secondary streams F within a plurality of exhaust nozzles 26. Cooling air streams represented by the arrows G may enter the suppressor 46 from a region forward of the suppressor along the exterior of exhaust conduit 22. The region around the exterior of exhaust conduit 22 may form an air plenum similar to the plenum 43 formed as described in regard to FIG. 3.

The cooling air streams G may enter directly into the exhaust ducts 52 while other cooling air streams indicated by arrows H may first pass over the exterior surfaces of the ducts 52 through cooling air passages 54 before entering the ducts. The cross-sectional area of the openings 28 is less than that of the ducts 52 with discharge of the gas streams F into the ducts 52 producing ejection regions 55 having a reduced pressure which is the driving force in drawing cooling air streams G and H into the ejection regions. Cooling air from the streams G may encounter flow separators 56 which divert the cooling air into various of the exhaust ducts 52. Additionally, flow reverser surfaces 58 are positioned to encounter cooling air streams H in reversing the flow direction of the streams in flowing from the cooling air passages 54 into the exhaust ducts 52.

An end plate 60 may be positioned against the end of the suppressor 46 to close the ends of the cooling air passages 54. As will be described, holes are provided in the end plate 60 for the passage of diluted exhaust streams I from the ducts 52. The cowl 48 may terminate in a cowl end surface 62 to provide inlet openings 64, 66, and 68 for the entrance of cooling air into the cooling air passages 54.

Turning to FIG. 7a, taken along the lines 7a—7a of FIG. 7, the end plate 60 may be secured to the end surfaces of the exhaust gas ducts 52 with outer ducts 52a having a generally trapezoidal cross-sectional configuration, and inner ducts 52b having a generally rectangular cross-sectional configuration. In addition to the air inlets 64, 66 and 68 (see FIG. 7) air inlets 70 may also be formed on either side of the cowl 48 as shown in FIG. 7a.

FIG. 7b, which is a sectional view taken along the line 7b—7b of FIG. 7a, illustrates air passing into a cooling air conduit 54 through air intake openings 64, 66, and 68 (see FIG. 7) with the air being distributed across the width of passage 54 by diverter members 72 and 74. The diverter members 72 extend further into the cooling air passages 54 than members 74. A stream of air $H_1$ entering the inlet opening 68 is diverted to the left as viewed in FIG. 7b by encountering diverter member 74 while a stream of air $H_2$ entering inlet opening 66 is likewise directed to the left or rearwardly by diverter member 72. The stream of air $H_3$ does not encounter the diverter members 72 and 74 and, thus, passes to the center of the cooling air passage 54 before flowing in a rearward direction. The effect of diverter members 72, 74, as described, is to spread the flow of cooling air across the width of a cooling air passage 54 to achieve more uniform cooling by the total air flow. Moreover, by separating the flow of cooling air streams $H_1$, $H_2$ and $H_3$ from the passage of diluted exhaust streams I through the end plate 60 (see FIG. 7), the tendency for the gases in the exhaust streams I to be drawn into openings 64, 66 or 68 is minimized.

FIG. 8 is a side view of a circular engine exhaust conduit 22 and an exhaust nozzle such as one of the nozzles 26 (FIG. 2 and FIG. 7). As illustrated, the configuration of the stream of exhaust gases may be changed as the exhaust gases pass from conduit 22 into one of the nozzles 26 to provide the stream with an elongated, generally rectangular sectional configuration as opposed to a circular configuration. This reduces the emissivity of the stream, as described, which makes the stream more difficult to detect by an infra-red radiation detector.

FIG. 9 is an end view of equally sized exhaust nozzles 75 emanating from an exhaust conduit 22 and terminating in exhaust openings 76. As the exhaust gas stream in conduit 22 passes into the nozzles 75, the stream is broken up into a plurality of smaller streams having an elongated, generally rectangular cross-sectional configuration. This assists in reducing the emissivity of the exhaust gas streams. In the embodiments of FIGS. 3 and 7, the exhaust nozzles 26 are not equally sized. However, in other respects, the nozzles 26 of FIGS. 3 and 7 function in the same manner as the nozzles 75 of FIG. 9 in changing the shape and emissivity of the exhaust gas streams. The use of equally sized nozzles 75, as in FIG. 9, is simply determined by the outer configuration of the infra-red suppressor which may have a rectangular cross-sectional configuration with equally sized exhaust ducts receiving exhaust gases from equally sized nozzles 75. This is in contrast to the use of unequally sized nozzles 26 and unequally sized exhaust ducts 30 and 52 when the suppressor 12 or 46 has a circular cross-sectional configuration (FIGS. 3 and 7).

FIG. 10 is a top sectional view, similar to FIG. 7, showing a further embodiment of the invention in which cooling air flows in a countercurrent direction to the flow of exhaust gases in cooling the exterior surfaces of ducts which carry the exhaust gases. An engine housing 77 may include a pair of engine exhaust conduits 78 mounted therein with each conduit terminating in a pair of exhaust nozzles 80 and 81.

The outer exhaust nozzles 80 and inner exhaust nozzles 81 are formed at the distal ends of each of the exhaust conduits 78 with the outer exhaust nozzles being somewhat smaller and positioned further to the rear than the inner exhaust nozzles 81. The engine housing 77 may terminate at an outer surface 82 and an infra-red suppressor, generally indicated as 84, may include a connecting flange 86 or a similar connecting member which is joined in any suitable manner to the outer surface 82.

Exhaust gas streams indicated by the arrows designated J may be discharged from the exhaust nozzles 80 and 81 into discharge members 88, 90, 92, and 94 with cooling air streams designated by the arrows K flowing through a plenum 96 surrounding the exhaust conduits 78. The discharge member 88 includes a cooling air passage 98 formed about the exterior surface of an exhaust duct 100 while the member 90 includes a cooling air passage 102 formed about the exhaust duct 104. The member 92 includes a cooling air passage 106 formed about an exhaust duct 108 and the member 94 includes a cooling air passage 110 formed about the exterior surface of an exhaust duct 112. The cooling air passages 98, 102, 106, and 110 are open at their distal ends with cooling air streams designated by the arrows L flowing into the open ends of the cooling air passages to remove heat from the exterior surfaces of the exhaust ducts 100, 104, 108 and 112. Gas diverter members 115 and 117 direct cooling air streams L into the ducts 100, 104, 108 and 112 and also assist in directing streams J and K to individual ducts. The openings from the exhaust nozzles 80 and 81 have cross-sectional areas that are smaller than the cross-sectional areas of the exhaust ducts 100, 104, 108 and 112 that receive the exhaust gas streams J from the openings such that ejection regions 113 are produced within the ducts which have a reduced pressure. As indicated, the ducts 104 and 108 are larger than ducts 100 and 112 just as the inner nozzles 81 are larger than the outer nozzles 80. However, the ratio of the areas of nozzles 81 with respect to ducts 104 and 108 is preferably the same as the ratio of the areas of nozzles 80 with respect to the areas of ducts 100 and 112 to provide essentially the same pressure reduction in each of the ejection regions 113. The flow of the cooling air stream L is countercurrent to the flow of exhaust gases J through the ducts 100, 104, 108 and 112 because of the reduced pressure within the ejection regions 113. Also, the cooling air streams K are drawn to the ejection regions 113 with the cooling air streams K and L being admixed with the exhaust gas streams J in the ejection regions to produce diluted exhaust streams M which are discharged from the ducts 100, 104, 108 and 112.

As indicated, the discharge members 88, 90, 92 and 94 are positioned to separate the streams M from each other. The direction of diluted exhaust streams M is indicated by a center line 114 for each of the streams with discharge boundaries for the streams being indicated by dotted line 116. By arranging the discharge members 88, 90, 92 and 94 as indicated in FIG. 10 to separate the gas streams M, the emissivity of an individual stream does not reinforce the emissivity of another stream to provide a higher emissivity which would be more readily visible to infra-red detection. Also, as indicated, the streams M are arranged such that there is a void region 118 between the streams discharging in the same general direction and a void region 119 between the streams discharging in a generally opposite direction. The void regions 118 and 119 permit the flow of the cooling air streams L to the cooling air passages 98, 102, 106, 110 without pulling gas from the exhaust streams M into the cooling air passages. This eliminates the need for an end plate or equivalent structure, such as the end plate 60 referred to in FIG. 7, in separating the entering cooling air streams L from the exhaust streams M being discharged.

The ducts 100, 104, 108 and 112 may be supported by Z-supports generally indicated as 120. As illustrated in FIG. 11, which is a sectional view taken along the line 11—11 of FIG. 10, the Z-supports 120 may include a center leg 122 and side legs 124, 126. The center leg 122 may act as a strut while the side legs 124 or 126 contact the ducts 100, 104, 108, 112 and support the ducts within a support shell generally indicated as 128. As indicated in FIG. 10, the Z-supports 120 may be positioned along the lengths of the ducts 100, 104, 108, 112 with the number of supports per duct being varied in relation to the length of the particular duct. For example, three Z-supports 120 may support the inner curved surfaces of ducts 100 and 112 while five Z-supports 120 may support the outer curved surface of these ducts. Similarly, seven Z-supports 120 may support the inner curved surfaces of ducts 104 and 108 while nine Z-supports may support the outer curved surfaces of these ducts. Due to the configuration of the Z-supports 120, the supports do not interfere unduly with the flow of cooling air streams L through the cooling air passages 98, 102, 106, 110 where the supports are positioned.

FIG. 12 is a detail section view taken along the line 12—12 of FIG. 11 to illustrate a specific form of the support shell 128. As indicated, the support shell 128 may include an outer sheet 130, an inner sheet 132, and a plurality of honeycomb separators 134 positioned between the inner and outer sheets. For example, inner and outer sheets 130 and 132 may be made of a material such as fiberglass, while the honeycomb separators 134 may be made of nylon. As indicated in FIG. 11, the support shell 128 not only passes around the exterior of the infra-red suppressor 84, but also may include cross members 128a, 128b, and 128c, to which the Z-supports 120 may be connected in supporting the ducts 100, 104, 108, 112. The ducts 100, 104, 108, 112 may be formed of aluminum while the regions between the aluminum ducts and the shell 128 define the air cooling passages 98, 102, 106, and 110.

I claim:

1. A device for shielding a heated surface from infra-red detection through an opening adjacent to the heated surface comprising:
   a gas-conducting member adapted to receive heated gases from the opening;
   said member having an exterior surface imperforate along its length, an interior surface, an inlet for receipt of heated gases, and an outlet for discharge of gases;
   said member having a configuration which blocks said inlet from line-of-sight view through said outlet;
   said member including means forming a plurality of nozzles each having an opening through which heated gases flow;
   means forming a plurality of spaced ducts each including an imperforate exterior wall surface and cooperating with said nozzles to form a plurality of fixed ejectors for intermixture of cooling air with heated gases to cool the heated gases and for flow of the intermixture to said outlet;
   each said duct having a fixed opening of a fixed predetermined size greater than the opening of the associated nozzle;
   cooling air passage means including walls which are imperforate along their length positioned between said ducts and cooperating with each said duct and said exterior surface of said member to cool the exterior surface of each said duct and the exterior surface of said member by passage of cooling air thereover;
   means for creating a region of reduced pressure for drawing cooling air into said cooling passage means;
   means forming a cooling air inlet for said cooling passage means and a discharge therefor; and,
   means forming a cooling air inlet for said ducts and a discharge therefor,
   whereby the heated gas in each said duct is cooled by admixture with cooling air while the exterior surface of said member and said duct is cooled by cooled air flowing through said cooling passage means.

2. The device of claim 1 wherein said ducts include exterior walls which are spaced from each other to form a flow passage between the exterior walls of adjacent ducts, and
   said cooling air passage means being formed by the flow passage between the exterior walls of the adjacent ducts whereby cooling air flows over the exterior surfaces of said ducts to cool the same as the hot gas within said duct is cooled by admixture with cooling air.

3. The device of claim 1 wherein all of the cooling air which enters said cooling air passage inlet flows through the cooling air passage means.

4. The device of claim 1 wherein the ducts have an elongated, generally rectangular configuration.

5. The device of claim 1 wherein the area ratio of each nozzle opening with respect to the duct opening is constant so as to provide essentially identical pressure reduction at each ejector.

6. The device of claim 1 wherein the flow of hot gas and cooling air through the ducts and the flow of cooling air through the cooling air passage means is in parallel spaced paths and in the same direction.

7. The device of claim 1 wherein the flow of cooling air through the cooling air passage means is countercurrent to the flow of hot gases and cooling air through the ducts, and
   means to admix the cooling air flowing through said cooling air passage means with the hot gases and cooling air as the mixture of the latter enters the ducts.

8. The device of claim 1 wherein each said duct includes an exit of predetermined opening,
   means surrounding the exit of each said duct and cooperating therewith to form a second series of ejectors,
   said second series of ejectors creating zones of reduced pressure to draw cooling air into said cooling air passage means.

9. The device of claim 1 wherein the means forming said cooling air passage means is spaced from the means forming a cooling air inlet for said ducts.

10. The device of claim 9 wherein cooling air flows from said cooling air inlet through said cooling air passage means, and
    said discharge of said cooling air passage means being located to effect flow of said discharged cooling air into the region of said ejectors.

11. The device of claim 10 further including flow reverser surface means located at the discharge of said cooling air passage means to direct said discharged flow into said ducts.

12. The device of claim 10 wherein each of said ducts and said cooling air passage means has a generally elongated configuration.

13. The device of claim 1 including
    an outer shell;
    said gas-conducting member being supported within said outer shell in spaced relation thereto;
    a plurality of Z-shaped support members placed between said outer shell and said gas-conducting member;
    said Z-shaped support members each having a center leg and side legs connected to the center leg on either side thereof with the side legs positioned generally transversely with respect to the center leg;
    said side legs being joined to the outer shell and the gas-conducting member, and
    the center legs of the Z-shaped support members serving as struts in supporting the gas-conducting member with respect to the outer shell.

14. A device for suppressing infra-red radiation from heated metal parts of an engine and from the heated exhaust gas of the engine during operation of the engine, comprising:

an exhaust conduit for receiving hot gas from the engine;

a main body portion having an imperforate wall forming an exterior surface and an interior surface and including an outlet;

a plurality of ducts each having an imperforate wall forming an exterior surface and an interior surface positioned in said main body portion in spaced relation to each other and to the interior wall of said main body portion, each said ducts having an inlet and an outlet;

said exhaust conduit terminating in a plurality of nozzles, each nozzle cooperating with one of said ducts to form an ejector whereby multiple regions of low pressure are formed, the space between the exterior surfaces of said ducts and the interior surface of said body portion forming a plurality of spaced cooling air passages each of which includes an imperforate wall;

means forming a cooling air inlet for said passages and an exit for the air flowing through said passages whereby all the cooling air entering the said cooling air inlet flows over the surfaces of said passages to the outlet of said passages, the flow of said cooling air through said passageways being operative to cool the exterior surface of said ducts and the interior surface of the main body portion;

means forming a cool air inlet for said ducts and cooperating with said regions of low pressure to draw cooling air into said ducts for admixture with hot gases from said nozzle to reduce the temperature of the hot gas;

the outlets of said ducts and said passages being located within said main body portion; and, said device having a configuration which blocks said nozzles from line-of-sight view through the outlet of said main body portion.

15. A device as set forth in claim 14 wherein the inlet to said passageways is adjacent to the inlet to said ducts.

16. A device as set forth in claim 14 wherein the inlet to said passageways is adjacent to the outlet of said ducts.

17. A device as set forth in claim 14 wherein the flow of cooling air through said passageways is in the same direction and parallel to the flow of mixed gas and cooling air through said ducts.

18. A device as set forth in claim 14 further including a plurality of separators supported within said main body portion and surrounding the outlet end of said ducts to form therewith a plurality of secondary ejectors and defining a plurality of regions of reduced pressure compared to the pressure upstream of the outlet of said ducts, and the reduced pressure of said secondary ejectors being operative to draw cooling air into the inlet of said passageways.

19. A device as set forth in claim 14 wherein the inlet of said passageways is located adjacent the outlet of said ducts and wherein the outlet of said passageways is located adjacent to the inlet of said ducts whereby cooling air is drawn into said passageways by the regions of low pressure associated with each said ejector for admixture of the cooling air from said passages with the cooling air and not gases flowing into said ducts.

20. A device as set forth in claim 19 including flow reverse means positioned at the outlet of said passageways to direct flow of cooling air from said passageways into said ducts.

21. A device for suppressing infra-red radiation from the gas plume and hot metal parts of a turbine engine comprising:

an exhaust conduit for receiving hot gas from the engine, said exhaust conduit terminating in a plurality of nozzles;

a main body portion surrounding said nozzles and including an imperforate wall having an interior wall surface and an exterior wall surface;

a plurality of ducts located within said main body portions, each duct being spaced from the interior wall surface of the main body portion and spaced from the remaining ducts and each including an imperforate wall having an interior wall surface and an exterior wall surface, each duct including an inlet and an outlet;

the inlet of each duct being positioned to receive flow of hot gas from one of said nozzles and cooperating therewith to form a plurality of ejectors defining a plurality of regions of low pressure;

the exterior wall surfaces of said ducts and the interior wall surfaces of said main body portion defining a plurality of passageways each including an imperforate wall including an inner wall surface which is the exterior surface of one of said ducts and the interior wall surface of said body portion while the exterior wall surfaces thereof are the interior wall surface of one of said ducts and the exterior wall surface of said main body portion, each passageway including an inlet at one end thereof and an outlet adjacent to the inlet of said ducts;

said plurality of regions of low pressure being operative to draw cooling air through the inlet of said passageway for flow of all of said air through said passageway to said outlet of said passageway;

means at the outlet of said passageway to direct flow of the cooling air exiting said passageway into the inlet of said ducts;

said plurality of regions of low pressure being operative to draw cooling air other than that from said passageways into the inlet of said ducts for admixture with hot gas from said nozzle whereby the hot gas is cooled by admixture while the walls of said passageway are cooled by the flow of cool air therethrough;

and said device having a configuration which blocks line-of-sight view of the hot gas and hot metal of the engine.

* * * * *